United States Patent
Chou et al.

(10) Patent No.: US 7,691,463 B2
(45) Date of Patent: Apr. 6, 2010

(54) OPTICAL RECORDING MATERIALS AND RECORDING MEDIUMS USING THE SAME

(75) Inventors: Lih-Hsin Chou, Hsinchu (TW);
Mei-Rurng Tseng, Hsinchu (TW);
Chung-Chih Chang, Hsinchu (TW);
Chin-Chi Chang, Hsinchu (TW);
Shun-Te Cheng, Hsinchu (TW);
Chien-Ming Huang, Hsinchu (TW);
Feng-Pin Hsu, Hsinchu (TW);
Wei-Chih Hsu, Hsinchu (TW);
Song-Yeu Tsai, Hsinchu (TW);
Ming-Hsun Hsieh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 940 days.

(21) Appl. No.: 10/995,432

(22) Filed: Nov. 24, 2004

(65) Prior Publication Data

US 2006/0110567 A1    May 25, 2006

(51) Int. Cl.
*B32B 3/02*    (2006.01)
(52) U.S. Cl. .................. 428/64.4; 428/64.5; 430/270.13
(58) Field of Classification Search ................ 428/64.4, 428/64.5; 430/270.13
See application file for complete search history.

(56) References Cited

U.S. PATENT DOCUMENTS

| 4,795,695 | A  | * | 1/1989 | Pan et al. ............... 430/270.13 |
| 6,707,783 | B2 | * | 3/2004 | Ohno ....................... 369/275.1 |
| 6,713,148 | B1 | * | 3/2004 | Hsu et al. .................. 428/64.1 |
| 7,018,698 | B2 | * | 3/2006 | Mizuno et al. ............. 428/64.1 |
| 2001/0048993 | A1 | | 12/2001 | Nonaka et al. |
| 2003/0063542 | A1 | * | 4/2003 | Ohno ....................... 369/59.11 |

FOREIGN PATENT DOCUMENTS

| CA | 2 345 849 A1 |   | 1/2002 |
| JP | 2002011958 A | * | 1/2002 |
| JP | 2004306595 A | * | 11/2004 |

* cited by examiner

*Primary Examiner*—Elizabeth Mulvaney
(74) *Attorney, Agent, or Firm*—Bacon & Thomas, PLLC

(57) ABSTRACT

A rewritable phase change optical recording medium includes a substrate, a dielectric layer deposited on a surface of the substrate, and an optical recording layer deposited on the dielectric layer, wherein the dielectric layer may be omitted. The optical recording layer contains a composition of $Ge_xSb_{100-x-y-z}M_yE_z$, wherein $0.5 \leq x \leq 14.5$; $0.5 \leq y \leq 14.5$; $0 \leq z \leq 14.5$; and M and E are different and are selected from the group consisting of Te, Cr, V, Ti, Ag, Sn, Si, Bi, Se, Al, Au, Ni, Fe, Cu, Mn, O, Ga, Cd, In, Pb and Hf, wherein M is not Te, when x is zero; and E is not Sn, when M is Te. The optical recording composition has a small crystal grain, a high ratio of reflectivity of the amorphous phase to that of the crystalline phase thereof, and a high crystallization rate, so that a blue light laser can be used to write/erase the recording medium.

20 Claims, No Drawings

OPTICAL RECORDING MATERIALS AND RECORDING MEDIUMS USING THE SAME

FIELD OF THE INVENTION

The present invention relates to a rewritable optical recording medium, particularly a rewritable optical recording medium using an optical recording material comprising a GeSb alloy, a third element, and optionally a fourth element as its optical recording layer.

BACKGROUND OF THE INVENTION

The use of a differential reflective index between a crystalline phase and an amorphous phase in an optical information storage medium was originated from Ovshinsky, et al. in 1970. Te alloys were the primary research subjects initially. The element Te is easy in forming an amorphous phase, but it has a crystallization temperature of only 10° C. and a rapid crystallization rate, which cause an unstable amorphous phase. In order to enhance the stability of the amorphous phase, other elements have been incorporated to form Te alloys. Dozens of alloy materials suitable for being used as an optical recording material have been made by researchers over the past 30 years. These materials include GeTe, GeTeS, SbSe, SbTe, BiTe, TeSeSbS, GeSnTe, TeSeGe, TeOInGeAu, SbSeBi, InSb+M, GaSbTe, TeSe+M, TeGeSbSe, GeSbTe, InSbTe, InSbSe, InTeSe, AgInTe, and AgInSbTe, etc. Up to now, however, only two major series of materials (GeSbTe and AgInSbTe) are phase change materials that are commercially feasible in the production of rewritable optical discs.

Furthermore, since the magnitude of the focal point of a laser light is proportional to the wavelength of the laser light, a recording density is inversely proportional to the wavelength of the laser light used. The CD series of optical discs adopt a near infrared (IR) light with a wavelength of 780 nm and have a capacity of 650 MB; and the DVD series of optical discs adopt an IR light with a wavelength of 635~650 nm and have a capacity of 4.7 GB. As for the next generation HD-DVD series of optical discs having a capacity of over 15 GB, a blue laser light with a wavelength of about 400 nm will be used. Thus, the search for phase change materials suitable for a blue laser light has become a major task in the development for a HD-DVD rewritable optical disc. Since 1999, major manufacturers of optical discs from Japan and Europe have been publishing phase change materials suitable for a blue laser light in major international conferences. Most of these materials are GeSbTe stoichiometric compound series and doped $Sb_{69}Te_{31}$ eutectic alloy series derived from those commonly used in the current Cd and DVD discs. These materials include GeSbTe, GeSbSnTe, Ge+ doped eutectic $Sb_{69}Te_{31}$, AgInSbTe, $Ge(Sb_{69}Te_{31})$+Sb and AgInSbTeGe, etc.

A GeSb binary alloy has an eutectic composition of $Ge_{14.5}Sb_{85.5}$ and an eutectic temperature of 592° C. When the temperature is lower than the eutectic temperature, the crystal forms include only the individual forms of Ge and Sb and are free of any other form. J. M. del Pozo, et al. [J. Non-cryst. Sol., Vol. 185 (1995) 183] have discovered that a GeSb alloy contains a gradually reduced amount of Ge crystals when the Sb concentration thereof increases gradually. Once the Sb concentration of the GeSb alloy exceeds that of the GeSb eutectic alloy, the crystallization behavior of the GeSb alloy is like pure Sb. C. N. Afonso, et al. [Appl. Phys. Lett. Vol. 60 (1992) 3123] have discovered that the crystallization temperature of GeSb alloy decreases gradually along with an increase in the Sb content therein, but remains higher than 150° C., while the activation energy thereof remains higher than 1.5 eV. When a GeSb film is written or erased by an extremely short laser pulsation (ps) and a higher energy density (13-56 mJ/cm²), a rapid amorphous-crystalline phase change and a higher contrast of reflective index can be obtained. However, the research of C. N. Afonso, et al. is a basic study on a single GeSb film layer. Moreover, an erase operation performed by a short laser pulsation and a high energy density used by the basic research is likely to cause a recording layer to form a partial crystallization and consequently reduce the modulation. Another major defect for a GeSb binary alloy being used as a recording material is that such an alloy has an excessively large grain size (about 0.1~5 μm) which renders said alloy unsuitable in optical recording. An ordinary CD has a recording track of about 1 μm, a blue laser light has a minimum recording track of about 0.21 μm, and a red light near-field recording has a minimum recording track of less than about 0.21 μm. In the latter two applications, a grain size of about 0.1~5 μm will cause an increased jitter.

SUMMARY OF THE INVENTION

A primary objective of the present invention is to provide an optical recording material, and a rewritable optical recording medium using said optical recording material as an optical recording layer.

Another major objective of the present invention is to provide a rewritable optical recording medium capable of being written and erased by a blue laser light.

A rewritable phase change type optical recording medium constructed according to the present invention comprises an optical recording layer comprising a composition of $Ge_xSb_{100-x-y-z}M_yE_z$, wherein $0.5 \leq x \leq 14.5$, $0.5 \leq y \leq 14.5$, $0 \leq z \leq 14.5$; and M and E are different and selected from the group consisting of Te, Cr, V, Ti, Ag, Sn, Si, Bi, Se, Al, Au, Ni, Fe, Cu, Mn, O, Ga, Cd, In, Pb and Hf, provided that M is not Te, when z is 0, and E is not Sn, when M is Te.

Preferably, M and E are selected from the group consisting of Te, Cr, V, Ti and Ag. More preferably, z is 0 when M and E are selected from the group consisting of Cr, V, Ti and Ag. In the preferred embodiments of the present invention, M can be Cr, V, Ti or Ag.

Preferably, said composition is $Ge_xSb_{100-x-y}Ag_y$, wherein $5.0 \leq x$ and $2.0 \leq y \leq 10.0$. More preferably, said composition is $Ge_{9.9}Sb_{83.9}Ag_{6.2}$.

Preferably, $z > 0$ and $x \geq 5.0$, when M and E are selected from the group consisting of Te, Cr, V, Ti and Ag, more preferably, M is Ag, and most preferably E is V or Cr.

The optical recording medium constructed according to the present invention comprises a substrate, wherein said optical recording layer is deposited on a surface of said substrate. The optical recording medium may further comprises a lower dielectric layer deposited on a surface of said substrate, wherein and said optical recording layer is deposited on said lower dielectric layer. Preferably, the optical recording medium as claimed in Claim 14 further comprises an upper dielectric layer deposited on said optical recording layer, and a reflective layer deposited on said upper dielectric layer.

DETAILED DESCRIPTION OF THE INVENTION

The present invention starts from $Ge_xSb_{100-x}$, wherein x<14.5, i.e. the content of Sb being higher than the eutectic point of the GeSb alloy, and separately added with a third element, and optionally a fourth element selected from a group consisting of Ti, Cr, V, Ag, Te, Sn, Bi, etc. It is desirable to use the addition of the third element to reduce the grain size and observe its influence on the fundamental properties of the alloy, e.g. the reflectivity contrast, the crystallization temperature, and the crystalline activation energy, etc. The results are listed in detail in Example 1. Example 2 uses an alloy of $Ge_xSb_{100-x}$, wherein x<14.5, added with a third element as a recording layer, subsequently an optical disc is prepared having a layered structure consisting of a dielectric layer/a recording layer/a dielectric layer/a reflective layer, formed on a polycarbonate (PC) substrate. Next, a blue laser light static and dynamic tester is used to measure the dynamic properties, e.g. carrier-to-noise ratio (CNR) and erasability, etc., of the recording layer within the blue laser light range.

EXAMPLE 1

A recording layer formed of a material of $Ge_xSb_{100-x}$ added with a third element, and optionally a fourth element, was deposited, and measured for the following properties: composition, crystallization temperature, crystalline activation energy, crystalline reflectivity, amorphous reflectivity, and grain size.

(a) Film Deposition:

This experiment used a d.c. magnetically controlled sputtering device for film deposition. A $Ge_1Sb_9$ alloy target 6-inch in diameter was separately adhered with 1~7 sheets of patches made of Cr, V, Ti, and Ag, etc. The size of the patches was 0.25-1.0 cm². Ar was used as the sputtering gas. The working pressure was set at 5 mTorr. The sputtering power was maintained at 275 W. The substrate was driven for a planetary revolution. The rotating speed of the stand was 15 RPM; and the rotation speed of the substrate was 75 RPM.

(b) Film Measurement:

This experiment used a 910 thermal-current-type Differential Scanning Calorimeter (DSC) (produced by TA Co., U.S.A.) to measure the crystallization temperature of a powder sample (1 mg-10 mg) scraped off from a test piece. Furthermore, various heating rates were used to obtain the crystalline activation energy. An aluminum pot was used to contain the powder, and various heating rates of 10° C., 20° C., 30° C., 40° C. were used to obtain the crystallization temperature, while Ar being introduced as a protective gas, the flow rate being 40 sccm, the range of temperature ramp being from room temperature to 500° C. Generally, a material with a crystallization temperature of 150° C.~200° C. and a crystalline activation energy larger than 1.5 eV is more suitable for used as an optical recording material in the commercial production of optical discs.

A U-3410-type spectrophotometer from the Hitachi Co. was used for measuring the optical reflectivity and the optical transmission. Prior to conducting the measurements, an alumina white board was used for calibrating the instrument. The measurement range was 350 nm~840 nm; and the scanning rate was 300 (600) nm/min. $R_a$ is the reflectivity of the material at an amorphous state; $R_c$ is the reflectivity of the material at a crystalline state; and $\Delta R$ is defined as $(R_c-R_a)/R_c$. If $R_c$ is lower than 15%, the tracking of an optical disc becomes difficult. If $R_a$ is higher than 70%, the micro structure of the recording layer will be difficult to undergo a phase change due to an excessively low photo absorption by the recording layer.

An Induction Coupled Plasma-Mass Spectrometer (ICP-MS) was used for the measurement of the film composition. A mixed acid of hydrofluoric acid and nitric acid ($HF:HNO_3$) was used to dissolve the film on a substrate. The resulting solution was diluted to a suitable concentration for analysis.

A High Resolution Transmission Electron Microscopy (HRTEM) was used to measure the grain size. An operation voltage of 400 KV was used to observe the structure of the fine texture of a layer, thereby estimating the grain size thereof. The grain size is preferably decreasing monotonically along with the decreasing recording marks.

(c) Experimental Results and Conclusions:

The measurement results are shown in Table 1. The crystallization temperature of $Ge_1Sb_9$ is 187.4° C. The crystalline activation energy is 2.45 eV. The amorphous reflectivity is 55.3% at a laser light wavelength of 405 nm. The ratios of reflectivity of the amorphous phase to that of the crystalline phase thereof are separately 15.7%, 18%, and 21.8% at 780 nm, 660 nm, and 405 nm. The grain size is about 120~300 nm. The results of adding different third elements or together with fourth elements are shown in the following:

$Ge_1Sb_9$+Cr: The crystallization temperature increases monotonically along with an increase in the content of Cr. The crystalline activation energies are all greater than 2.45 eV. $\Delta R$ increases monotonically along with an increase in the content of Cr. However, when the wavelength was at 405 nm and the content of Cr is >15.5 at %, $\Delta R$ is about 3.2%. The grain size decreases along with an increase in the content of Cr.

$Ge_1Sb_9$+V: The crystallization temperature increases monotonically along with an increase in the content of V. The crystalline activation energies are all higher than 3.08 eV. $\Delta R$ increases initially and then decreases along with an increase in the content of V. The grain size decreases monotonically along with an increase in the content of V.

$Ge_1Sb_9$+Ti: The crystallization temperature increases monotonically along with an increase in the content of Ti. The crystalline activation energy decreases monotonically along with an increase in the content of Ti and is higher than 2.95 eV. $\Delta R$ increases monotonically along with an increase in the content of Ti. However, when the wavelength is at 405 nm, $\Delta R$ decreases along with an increase in the content of Ti. The grain size decreases monotonically along with an increase in the content of Ti.

$Ge_1Sb_9$+Ag: The crystallization temperature and the crystalline activation energy both decrease monotonically along with an increase in the content of Ag. $\Delta R$ varies slightly along with an increase in the content of Ag, and the values thereof are 10%, 11.5%, and 15% at 780 nm, 660 nm, and 400 nm, respectively.

$Ge_1Sb_9$+Ag+Cr: The crystallization temperature and the crystalline activation energy both decrease along with the addition of Ag and Cr. $\Delta R$ decreases to about 12.5% (780 nm and 660 nm) and about 11.5% (405 nm) along with the addition of Ag and Cr. The grain size decreases along with the addition of Ag and Cr.

$Ge_1Sb_9$+Ag+V: The crystallization temperature decreases monotonically along with the addition of Ag and V. The crystalline activation energy decreases monotonically along with an increase in the contents of Ag and V, and is higher than 2.9 eV. $\Delta R$ decreases along with the addition of Ag and V. The grain size decreases along with the addition of Ag and V.

The main requirements and functions of a material for a recording layer of a rewritable phase change type optical disc include: (1) access power: a differential reflectivity between the crystalline phase and the amorphous phase being large enough ($\Delta R$>10%) for differentiation, (2) writing power: a low melting point (500~1000° C.) and a suitable heat dissipating film layered structure for the convenience in writing into an amorphous recording track, (3) erase power: a high crystallization rate, for a data transfer rate of 36 Mbps, the crystallization rate being needed to be <55 ns in order to achieve the objective of direct writing with a single optical beam, (4) data stability: a suitable crystallization temperature (>150° C.) and a suitable crystalline activation energy (>1.5 eV) for increasing the stability of the recording track (temperature withstanding to 60° C.), (5) rewrite power: a material or a film layered structure with stability for avoiding the deterioration or damage caused by materials flow after writing/erasing operations being repeated many times. Items (1), (2) and (4) are requirements for a material served as a recording layer, and can be measured only with a single deposited film layer. Items (3) and (5) can only be measured as an optical disc with a complete layered structure (a lower dielectric layer/a recording layer/an upper dielectric layer/a reflective layer). A portion of the results are shown in Example 2. From the requirements of Items (1), (2) and (4) and the experimental results shown in Table 1, a list of-materials suitable as a recording layer within a wavelength ($\lambda$) of 385 nm~850 nm include: $Ge_{11.0}Sb_{89.0}$, $Ge_{8.7}Sb_{90.8}Cr_{0.5}$, $Ge_{9.2}Sb_{89.6}Cr_{1.2}$, $Ge_{9.2}Sb_{86.7}Cr_{4.1}$, $Ge_{9.3}Sb_{89.7}Cr_{1.0}$, $Ge_{9.0}Sb_{88.2}V_{2.8}$, $Ge_{9.2}Sb_{86.9}V_{3.9}$, $Ge_{7.2}Sb_{89.4}Ti_{3.4}$, $Ge_{6.9}Sb_{85.1}Ti_{8.0}$, $Ge_{5.3}Sb_{92.9}Ag_{1.9}$, $Ge_{10.5}Sb_{87.2}Ag_{2.4}$, $Ge_{10.2}Sb_{85.9}Ag_{3.9}$, $Ge_{9.9}Sb_{83.9}Ag_{6.2}$, $Ge_{9.6}Sb_{81.2}AG_{9.2}$, $Ge_{9.1}Sb_{86}Ag_{3.5}Cr_{1.5}$, $Ge_{9.7}Sb_{88.7}Ag_{1.2}V_{0.4}$, and $Ge_{9.5}Sb_{87.8}Ag_{2.3}V_{0.3}$. However, the grain size of $Ge_{11.0}Sb_{89.0}$ is too large to obtain an accurate reading of signals due to an excessive jittering. Furthermore, the grain sizes of $Ge_{7.2}Sb_{89.4}Ti_{3.4}$ and $Ge_{6.9}Sb_{85.1}Ti_{8.0}$ are slightly too large which may cause an excessive jittering for an optical disc with a recording track smaller than 0.4 μm and should be applicable for an optical disc with a larger recording track (>0.4 μm).

EXAMPLE 2

A PC substrate was sequentially deposited with a lower dielectric layer of $ZnS$—$SiO_2$, a recording layer of $Ge_1Sb_9$ added with a third element, an upper dielectric layer of $ZnS$—$SiO_2$, and a reflective layer of Al—Ti. The static and dynamic properties of the resulting optical discs were measured in order to test the feasibility for such a recording layer material in the fabrication of a rewritable phase change optical disc.

(a) Film Deposition:

This experiment used a d.c. and a.c. magnetically controlled sputtering device for film deposition in making an optical disc. A target for the dielectric layer was a $ZnS$—$SiO_2$ disc 6-inch in diameter with the following sputtering conditions being used: the sputtering gas being Ar, the working pressure being set at 5 mTorr, and the sputtering power being maintained at 500 W. A target for the recording layer was a $Ge_1Sb_9$ alloy disc 6-inch in diameter and attached with a patch formed of a third element of Ag or V. Also, the same film deposition conditions as in Example 1(a) were used. A target for the reflective layer was an Al—Ti alloy disc 6-inch in diameter with the following sputtering conditions being used: the sputtering gas being Ar, the working pressure being 5 mTorr, and the sputtering power being maintained at 200 W. The substrate was made of PC and was driven for a planetary revolution. The revolution rate was 15 RPM; and the autorotation rate was 75 RPM. The layered structure of the optical disc in the sequence from the PC substrate was composed of a lower dielectric layer (75~90 nm)/a recording layer (13~20 nm)/an upper dielectric layer (20 nm)/a reflective layer (90~135 nm).

(b) Measurements for the Static and Dynamic Properties of the Optical Disc:

A MEDIATEST-1 blue laser light static tester from TOPTICA Co. of Germany was used for the measurement on the static properties of the optical disc. Mainly, the crystallization rate of the phase change material was measured. A laser light with a wavelength of 420 nm was used for writing, and a wavelength of 397 nm was used for reading. A DDU-1000 blue laser light dynamic tester from PULSTEC Co. of Japan was used for the measurement on the dynamic properties of the optical disc. Mainly, dynamic properties, such as CNR, erasibility, modulation, reflection, and jitter, were measured. The following test conditions were used: wavelength of laser being 405 nm, clock=26.16 MHz, constant linear velocity (CLV)=3.5 m/s, 3T mark size=400 nm.

(c) Experimental Results and Conclusions:

The experimental results are shown in Table 2. A recording layer made of $Ge_1Sb_9$ added with Ag shows better dynamic properties, wherein the crystallization temperature of $Ge_{9.9}Sb_{83.9}Ag_{6.2}$ was 160° C., 3T CNR=45~48 dB, 11T erasibility =13~25 dB. Even though the crystallization rate is not measured, the crystallization rate of $Ge_{9.9}Sb_{83.9}Ag_{6.2}$ is estimated to be less than 50 ns due to the facts that the crystallization rate of $Ge_{5.3}Sb_{94.7}$ was 50-100 ns and the 11T erasibility of a disc made from $Ge_{9.9}Sb_{83.9}Ag_{6.2}$ is 13~25 dB which is far exceeding the erasibility of a disc made from $Ge_{5.3}Sb_{94.7}$. Therefore, it is estimated that a material according to this example is suitable for the fabrication of a blue laser light ($\lambda$=400~405 nm) optical disc.

TABLE 1

| Sample | GeSb$_9$ + patches of elements | Concentration of elements | $T_c$ (° C.) | $E_a$ (eV) | Transmission rate (Tc; Ta) % | | |
|---|---|---|---|---|---|---|---|
| | | | | | 780 nm | 660 nm | 405 nm |
| 1 | GeSb$_9$ | Ge$_{11}$Sb$_{89}$ | 187.4 | 2.45 | 2.4; 8.1 | 1.8; 6.1 | 2.1; 2.3 |
| 2 | GeSb$_9$ + Cr*1 | Ge$_{8.7}$Sb$_{90.8}$Cr$_{0.5}$ | 195 | 2.8 | 4.7; 9.6 | 4.3; 7.6 | 5.6; 3.86 |
| 3 | GeSb$_9$ + Cr*2 | Ge$_{9.2}$Sb$_{89.6}$Cr$_{1.2}$ | 197 | 3.54 | 5.6; 12.9 | 5.5; 10.9 | 9.4; 7.8 |
| 4 | GeSb$_9$ + Cr*4 | Ge$_{9.2}$Sb$_{86.7}$Cr$_{4.1}$ | 219 | 3.96 | 6; 13.3 | 5.2; 11.1 | 7.2; 7.7 |
| 5 | GeSb$_9$ + Cr*7 | Ge$_{7.7}$Sb$_{76.8}$Cr$_{15.5}$ | 201.1 | 2.78 | 14.8; 23.9 | 14.4; 21.3 | 21.7; 18.2 |
| 6 | GeSb$_9$ + V*2 | Ge$_{9.3}$Sb$_{89.7}$V$_{1.0}$ | 200.7 | 3.8 | 3.5; 9.7 | 3.1; 7.7 | 4.5; 4 |
| 7 | GeSb$_9$ + V*4 | Ge$_{9.0}$Sb$_{88.2}$V$_{2.8}$ | 215.23 | 3.14 | 4.5; 10.6 | 3.9; 8.5 | 5.4; 4.9 |
| 8 | GeSb$_9$ + V*6 | Ge$_{9.2}$Sb$_{86.9}$V$_{3.9}$ | 215.58 | 3.15 | 6.5; 16.7 | 6.2; 14.5 | 9.5; 11.4 |
| 9 | GeSb$_9$ + V*9 | Ge$_{8.9}$Sb$_{84.4}$V$_{6.7}$ | 224.25 | 3.08 | 13.6; 21.2 | 12.9; 18.5 | 19.9; 15.3 |
| 10 | GeSb$_9$ + Ti x 2 | Ge$_{7.2}$Sb$_{89.4}$Ti$_{3.4}$ | 205.8 | 3.59 | 2.9; 8.3 | 2.4; 6.4 | 3; 2.7 |
| 11 | GeSb$_9$ + Ti x 4 | Ge$_{6.9}$Sb$_{85.1}$Ti$_{8.0}$ | 210.8 | 3.36 | 3.1; 8.6 | 2.7; 6.8 | 3.6; 3.2 |
| 12 | GeSb$_9$ + Ti x 7 | Ge$_{6.1}$Sb$_{74.2}$Ti$_{19.7}$ | 216 | 2.95 | 6.9; 13.2 | 6.3; 11 | 9.4; 7.9 |
| 13 | GeSb$_9$ + Ag*½ | Ge$_{5.3}$Sb$_{92.9}$Ag$_{1.9}$ | 170.8 | 2.8 | 3.8; 9.0 | 3.3; 7.2 | 4.3; 3.6 |
| 14 | GeSb$_9$ + Ag*1 | Ge$_{10.5}$Sb$_{87}$Ag$_{2.4}$ | 165.8 | 2.39 | 3.2; 8.5 | 2.4; 6.7 | 2.5; 3.2 |
| 15 | GeSb$_9$ + Ag*2 | Ge$_{10.2}$Sb$_{85}$Ag$_{3.9}$ | 161.1 | 1.87 | 2.4; 6.9 | 1.8; 5.0 | 1.7; 1.8 |
| 16 | GeSb$_9$ + Ag*3 | Ge$_{9.9}$Sb$_{83.9}$Ag$_{6.2}$ | 158.6 | 1.84 | 2.7; 7.4 | 2; 5.5 | 1.9; 2.2 |

TABLE 1-continued

| | | | | | | | | |
|---|---|---|---|---|---|---|---|---|
| 17 | GeSb$_9$ + Ag*4 | Ge$_{9.6}$Sb$_{81.2}$Ag$_{9.2}$ | 158.2 | 1.79 | 3.1; 7.5 | 2.4; 5.7 | 2.4; 2.5 | |
| 18 | GeSb$_9$ + Ag*1 + Cr*1 | Ge$_{9.1}$Sb$_{86}$Ag$_{3.5}$Cr$_{1.5}$ | 168 | 2.4 | 2.7; 5.6 | 2.4; 5 | 3.6; 7 | |
| 19 | GeSb$_9$ + Ag*0.5 + V*1 | Ge$_{9.7}$Sb$_{88.7}$Ag$_{1.2}$V$_{0.4}$ | 171.7 | 3.9 | 8.1; 8.6 | 7.5; 6.9 | 8.2; 3.5 | |
| 20 | GeSb$_9$ + Ag*1 + V*1 | Ge$_{9.5}$Sb$_{87.8}$Ag$_{2.3}$V$_{0.5}$ | 167.3 | 2.9 | 3.2; 9.6 | 2.7; 7.8 | 3.8; 4.3 | |

| | Reflectivity($R_c$; $R_a$) % | | | $\Delta R$ ($R_c - R_a/R_c$ (*100%)) | | | Grain size |
|---|---|---|---|---|---|---|---|
| Sample | 780 nm | 660 nm | 405 nm | 780 nm | 660 nm | 405 nm | (nm) |
| 1 | 79.5; 67.0 | 75.7; 62.1 | 70.7; 55.3 | 15.7 | 18.0 | 21.8 | 120~300 |
| 2 | 78; 68.8 | 74.7; 65.4 | 70.3; 60.1 | 11.8 | 12.4 | 14.5 | 40~70 |
| 3 | 72; 60.6 | 69.31; 59.14 | 68; 49.5 | 15.8 | 14.7 | 9.7 | 20~60 |
| 4 | 71.5; 58.6 | 69.3; 57 | 64.1; 54.1 | 18.0 | 17.7 | 15.6 | 10~40 |
| 5 | 53.6; 43.2 | 52.3; 43.4 | 45.26; 43.8 | 19.4 | 17.0 | 3.2 | 5~20 |
| 6 | 78.9; 67.8 | 75.5; 64.2 | 70.6; 58.3 | 14.1 | 15.0 | 17.4 | 40~80 |
| 7 | 75.6; 62.1 | 73; 59.9 | 67.7; 56 | 17.9 | 18.0 | 17.3 | 40~90 |
| 8 | 71.1; 59.6 | 68.9; 58.3 | 63.9; 56.5 | 16.2 | 15.4 | 11.6 | 30~70 |
| 9 | 53.2; 45.6 | 53.2; 45.2 | 43.7; 43.7 | 14.3 | 15.0 | 0.0230 | 20~50 |
| 10 | 78.7; 70.2 | 75.6; 66.2 | 71; 60.5 | 10.8 | 12.4 | 14.8 | 120~250 |
| 11 | 78; 69.4 | 75; 65.2 | 70.3; 60.1 | 11.1 | 13.1 | 14.5 | 120~200 |
| 12 | 69.5; 56.8 | 67.6; 55.8 | 61.9; 54.3 | 18.3 | 17.5 | 12.3 | 40~60 |
| 13 | 77.8; 69 | 74.8; 65.8 | 71; 61.3 | 11.3 | 12.0 | 13.7 | 50~250 |
| 14 | 77.9; 70.3 | 75; 66.4 | 72.1; 61.1 | 9.7 | 11.5 | 15.3 | 5~20 |
| 15 | 78.5; 71.6 | 75.3; 66.7 | 72.8; 61.2 | 8.7 | 11.4 | 15.9 | 10~15 |
| 16 | 78.4; 71.3 | 75.3; 66.6 | 72.7; 61.3 | 9.0 | 11.6 | 15.7 | 5~15 |
| 17 | 77.7; 70.5 | 74.9; 66.5 | 72; 61.5 | 9.3 | 11.2 | 14.6 | 5~15 |
| 18 | 73.1; 64.1 | 71; 62.1 | 66.8; 59.1 | 12.3 | 12.5 | 11.5 | 10~30 |
| 19 | 78.4; 69.3 | 75.3; 65.9 | 71.2; 61.5 | 11.6 | 12.5 | 13.6 | 50~150 |
| 20 | 75.4; 69.2 | 72.8; 65.9 | 68.8; 61.5 | 8.2 | 9.4 | 10.6 | 10~40 |

—: un-measured
$T_c$: Crystallization temperature
$E_a$: Crystalline activation energy

TABLE 2

Composition, crystallization temperature, dynamic and static test results by a blue laser light ($\lambda$ = 405 nm) for a material formed of GeSb$_9$ added with a third element

| | Tests on dynamic properties | | | | | Static test |
|---|---|---|---|---|---|---|
| Sample | 3T CNR (dB) | 11T erasibility (dB) | Modulation I14/I14H (%) | Reflectivity (%) | Jitter (%) | Crystallization rate (ns) |
| 1 | 32 | 0~5 | — | — | — | 50~100 |
| 14 | 35~40 | 0~5 | — | — | — | — |
| 15 | 35~40 | 15~20 | — | — | — | — |
| 16 | 45~48 | 13~25 | — | — | — | — |
| 6 | 40~44 | 0~5 | — | — | — | — |

—: un-measured

The invention claimed is:

1. A rewritable phase change type optical recording medium, which comprises an optical recording layer comprising a composition of Ge$_x$Sb$_{100-x-y-z}$M$_y$E$_z$, wherein $0.5 \leq x \leq 14.5$, $0.5 \leq y \leq 14.5$, $0 \leq z \leq 14.5$; and M and E are different and selected from the group consisting of Cr, V, Ti and Ag.

2. The optical recording medium as claimed in claim 1, wherein z is 0.

3. The optical recording medium as claimed in claim 2, wherein M is Cr

4. The optical recording medium as claimed in claim 2, wherein M is V.

5. The optical recording medium as claimed in claim 2, wherein M is Ti.

6. The optical recording medium as claimed in claim 2, wherein M is Ag.

7. The optical recording medium as claimed in claim 6, wherein $5.0 \leq x$ and $2.0 \leq y \leq 10.0$.

8. The optical recording medium as claimed in claim 6, wherein said composition is Ge$_{9.9}$Sb$_{83.9}$Ag$_{6.2}$.

9. The optical recording medium as claimed in claim 1, wherein $z > 0$ and $x \geq 5.0$.

10. The optical recording medium as claimed in claim 9, wherein M is Ag.

11. The optical recording medium as claimed in claim 10, wherein E is V.

12. The optical recording medium as claimed in claim 10, wherein E is Cr.

13. The optical recording medium as claimed in claim 1 further comprising a substrate, wherein said optical recording layer is deposited on a surface of said substrate.

14. The optical recording medium as claimed in claim 1 further comprising a substrate, and a lower dielectric layer deposited on a surface of said substrate, wherein and said optical recording layer is deposited on said lower dielectric layer.

15. The optical recording medium as claimed in claim 13 further comprising an upper dielectric layer deposited on said optical recording layer, and a reflective layer deposited on said upper dielectric layer.

16. The optical recording medium as claimed in claim 14 further comprising an upper dielectric layer deposited on said optical recording layer, and a reflective layer deposited on said upper dielectric layer.

17. A rewritable phase change type optical recording medium, which comprises an optical recording layer of a rewritable phase change type comprising a composition of $Ge_xSb_{100-x-y-z}M_yE_z$, wherein $0.5 \leq x \leq 14.5$, $2.0 \leq y \leq 10.0$, and $0 \leq z \leq 14.5$; and M and E are different and selected from the group consisting of Cr, V, Ti, Ag, Sn, Si, Bi, Se, Al, Ni, Fe, Cu, Mn, O, Ga, Cd, In, Pb and Hf.

18. The optical recording medium as claimed in claim 17, wherein the composition is $Ge_xSb_{100-x-y-z}M_yE_z$, wherein $5.0 \leq x$, $2.0 \leq y \leq 10.0$, $0 \leq z \leq 14.5$, and E is Ag.

19. A rewritable phase change type optical recording medium, which comprises an optical recording layer of a rewritable phase change type comprising a composition of $Ge_xSb_{100-x-y-z}M_yE_z$, wherein $0.5 \leq x \leq 14.5$, $0.5 \leq y < 14.0$, $0 \leq z \leq 14.5$; and wherein M and E are different and selected from the group consisting of Cr, V, Ti, Ag, In, Si, Bi, Se, Al, Ni, Fe, Cu, Mn, O, Ga, Cd, Pb and Hf.

20. A rewritable phase change type optical recording medium, which comprises an optical recording layer of a rewritable phase change type comprising a composition of $Ge_xSb_{100-x-y-z}M_yE_z$, wherein $0.5 \leq x \leq 14.5$, $0.5 \leq y < 14.0$, $0 \leq z \leq 14.5$; and wherein M and E are different and selected from the group consisting of Cr, V, Ti, Ag, Si, Bi, Se, Al, Ni, Fe, Cu, Mn, O, Ga, Cd, Pb and Hf.

* * * * *